(12) United States Patent
Engdahl et al.

(10) Patent No.: US 7,302,408 B2
(45) Date of Patent: Nov. 27, 2007

(54) TECHNIQUE FOR TRANSACTION RECONCILIATION

(75) Inventors: Stephen Frederick Engdahl, Baltimore, MD (US); Kevin Davis, Columbia, MD (US)

(73) Assignee: CheckFree Corporation, Norcross, GA (US)

( * ) Notice: Subject to any disclaimer, the term of this patent is extended or adjusted under 35 U.S.C. 154(b) by 724 days.

(21) Appl. No.: 10/133,649

(22) Filed: Apr. 29, 2002

(65) Prior Publication Data

US 2003/0204456 A1   Oct. 30, 2003

(51) Int. Cl.
*G07B 17/00*   (2006.01)
*G07F 19/00*   (2006.01)
*G07F 7/10*   (2006.01)

(52) U.S. Cl. .......................................... 705/30; 705/33

(58) Field of Classification Search .................. 705/30, 705/33
See application file for complete search history.

(56) References Cited

U.S. PATENT DOCUMENTS

| | | | | | |
|---|---|---|---|---|---|
| 5,093,787 | A | * | 3/1992 | Simmons ..................... | 705/33 |
| 5,412,190 | A | * | 5/1995 | Josephson et al. ........... | 705/45 |
| 5,689,579 | A | * | 11/1997 | Josephson ................... | 382/137 |

OTHER PUBLICATIONS www.checkfree.com found using www.archive.com's Wayback Machine, pages used in this rejection were available to the public on Feb. 29, 2000.*

* cited by examiner

*Primary Examiner*—James Kramer
*Assistant Examiner*—Rajesh Khattar
(74) *Attorney, Agent, or Firm*—Sutherland Asbill & Brennan LLP

(57) ABSTRACT

A computerized accounting technique is provided. A record of a first type of transaction is identified based upon a record of a second type of transaction. The first type of transaction is a different type of transaction than the second type of transaction. Data is added to the record of the second type transaction based upon the identity of the first type transaction. Based upon this added data, the record of the second type transaction is reconciled with another record representing the second type transaction.

23 Claims, 22 Drawing Sheets

| | WE Side | THEY Side |
|---|---|---|
| Cash Balance Pool | $2,000,000 Debit, RefNum: ABC  420A — 418A | $2,000,000 Credit, RefNum: 987  418B — 420B  <br>$2,000,000 Credit, RefNum: 456  418C — 420C  <br>$2,000,000 Credit, RefNum: 123  418D — 420D  <br>$2,000,000 Credit, RefNum: 654  418E — 420E  <br>$2,000,000 Credit, RefNum: 765  418F — 420F |

Enrichment Passes

Choose data enrichment criteria below. You may create multiple passes using separate enrichment criteria

| cash 3 – securities 3 – they | Add | Create a new pass |
| cash 3 – securities 3 we | | |
| cash2 – securities 2 – ut1 | | |
| cash4 – securities 4 – we/they | Delete | Delete selected pass |
| cash-securities w/o | | |
| fe2 – securities 2 – ut2 | | |
| sec 3 – cash 3- they/they | Edit | Edit selected pass |
| sec 3 – cash 3- we/we | | |
| securities 4 – cash 4 – they/we | View | View selected pass |
| securities-cash | | |
| | Copy | Make a copy of the selected pass |

OK   Cancel   Help

Enrichment Pass Name

901

Specify a name for this enrichment pass. This name needs to be unique within all enrichment passes in the company.

It's a good idea to specify a name that indicates some of the characteristics of the pass.

Name: securities

NAME

< Back | Next > | Cancel | Help

FIG. 13

Define Destination

Define the account side and field of the enrichment destination which will be used to link with items in the source.

Side: They Side

Link Field:
Branch
PageNumber
PrimarySecurityIdentifier
RefNum
Statement

DESTINATION SIDE

< Back | Next > | Cancel | Help

1301

Enrichment Fields

1501

Define what data will be passed from source to destination when a link between a source item and a destination item is found.

Populate Addr1 with Account from source item
Populate UserText1 with RefNum from source item's match
Populate CustAccNum with default value of enriched

ENRICHMENT CRITERIA

Add    Edit    Delete

< Back    Next >    Cancel    Help

Enrichment Detail

Define what data will be passed from source to destination when a link between a source item and a destination item is found.

Destination Field: [USERTEXT ▾]

Source
- ○ Draw data from source item
  Field: [CustAccNum ▾]
- ● Draw data from source item's match
  Field: [RefNum ▾]
- ○ Default data to: [        ]

[ OK ]   [ Cancel ]

— 1601

Reversal Options

You have chosen to enrich items using information from an item matched with your source item.

Please specify below what should occur if the match group of the source item is dissolved.

⦿ Do not reverse the enrichment
○ Reverse the enrichment
○ Reverse the enrichment only if the destination item is unmatched ☐ If matched, add the following message to the item:

[▽]

[ <Back ] [ Next> ] [ Cancel ] [ Help ]

REVERSAL OPTIONS

TECHNIQUE FOR TRANSACTION RECONCILIATION

FIELD OF THE INVENTION

The present invention relates to electronic accounting systems and more particularly to electronic reconciliation of transactions across domains.

BACKGROUND OF THE INVENTION

Both individual consumers and business entities have long had a need to reconcile, i.e., match, internally generated transactions, i.e., "we" side transactions, against corresponding transactions from a variety of external sources, i.e., "they" side transactions. Also known in the accounting arts are transactions known as "internal" side transactions, though for simplicity's sake discussion herein will focus on "we" and "they" side transactions. However, it should be understood that the present invention is equally application to the processing of "internal" side transactions. An internal transaction is a transaction which involves a single party e.g., a transaction that shifts funds between accounts belonging to a single party. Traditionally, reconciliation has been closely related to accounting methods and principles. A transaction which cannot be reconciled is known as an exception. A simple example is the reconciliation of check register transactions, i.e., "we" side transactions, against corresponding bank statement transactions, i.e., "they" side transactions.

Accounting systems and software exist which aid in reconciliation. However, exceptions still occur even when reconciliation is performed by such systems and software. Whenever a transaction cannot be reconciled using automated techniques, a person must manually reconcile that transaction. This can be an expensive and time consuming process, which may put an account holder in a position of financial risk while an account is unreconciled. Furthermore, for business entities, as different persons may be manually reconciling exceptions, the exceptions may not be resolved on a consistent, best practice basis.

Large business entities generate an ever-increasing volume and complexity of transactions which require reconciliation. In addition to a massive amount of transactions to reconcile, often reconciliation is not a one-to-one process. That is, a "they" side transaction may encompass multiple "we" side transactions, or vice-versa. This volume and complexity often results in a delay in reconciling transactions, which in turn results in a delay in providing critical information to the business entity.

Furthermore, problems associated with reconciliation are exacerbated when a business entity deals in different types of transactions, i.e., cash transactions, securities transactions, and foreign exchange/trade transactions. Transactions of the same type are said to belong to the same balance pool. Typically, business entities are structured such that different departments and personnel are responsible for only one type of balance pool. However, related transactions are often found in different balance pools, such related transactions are known as cross-domain transactions. Cross-domain transactions often give rise to exceptions. When an exception exists involving a cross-domain transaction it is often a difficult and time-consuming manual endeavor to resolve the exception, especially since information necessary to resolve the exception exists in association with a transaction belonging to a balance pool different than the balance pool for which the person reconciling the exception has responsibility.

Accordingly, a need exists for a technique to facilitate manual reconciliation of cross-domain transactions.

Existing accounting systems and software packages are designed to reconcile transactions of one type, i.e., transactions belonging to the same balance pool, not cross-domain transactions. As a result, a cross-domain transaction will often result in an exception which requires manual reconciliation because information necessary for reconciliation is unavailable to the system or software.

Accordingly, a need exists for an automated technique to electronically reconcile cross-domain transactions.

OBJECTS OF THE INVENTION

It is an object of the present invention to provide a technique to facilitate manual reconciliation of exceptions.

It is a further object of the present invention to provide an automated technique for reconciliation of exceptions.

It is yet another object of the present invention to provide a technique for automatic reconciliation of cross-domain transactions.

The above-stated objects, as well as other objects, features, and advantages, of the present invention will become readily apparent from the following detailed description which is to be read in conjunction with the appended drawings.

SUMMARY OF THE INVENTION

In accordance with a first embodiment of the present invention, a computerized accounting method and a system for implementing the method are provided.

According to the method of this first embodiment, a record of a first type transaction is identified based upon data associated with a record of a second type transaction. A transaction record includes information which describes a transaction. This descriptive information (associated data) can be any type of information associated with a transaction. There are multiple types of transactions, including, but not limited to, cash transactions, securities transactions, and foreign currency transactions. The first and second transactions are different type transactions. The record of the first type transaction is identified based upon the descriptive information associated with the record of the second type transaction.

Also according to this first embodiment, data based on the identified first transaction record is imported to the second transaction record. That is, information is added to the second transaction record. This added information is based upon the identified first transaction record. The added information is not necessarily information which describes the first transaction, though it certainly could be.

After the data has been imported to the second transaction record, the second transaction record is reconciled with a third transaction record which also represents the second type transaction. This reconciliation can be a manual reconciliation or an automatic reconciliation. That is, a human could perform the reconciliation, or a computer could perform the reconciliation.

In accordance with one aspect of the present invention, the data imported to the second transaction record is data associated with either the first transaction record or a fourth transaction record which is reconciled with the first transaction record. That is, the imported information can be information from the first transaction record, or information from another transaction record which has been matched with the first transaction record.

In an especially beneficial aspect of this embodiment, the reconciliation is an automatic reconciliation. That is, a computer performs the reconciliation of the second transaction record based upon the imported information.

The system for implementing the first embodiment of the present invention comprises a memory which stores the transaction records described above. The memory can be any type of memory capable of storing data. The system also comprises a processor which identifies the first transaction record based upon data associated with the second transaction, imports the data based upon the identified first transaction record to the second transaction record, and reconciles the second transaction record with a third transaction record based on the imported data. The processor can be any type of processor capable of functioning as described herein.

In accordance with a second embodiment of the present invention, a computerized accounting method and system for reconciling a record of a first type transaction based at least in part upon information associated with a record of a second type transaction are provided.

In accordance with this second embodiment, one or more first type transaction records and one or more second type transaction records are stored. The one or more second type transactions are of a different type than the one or more first type transactions. Each transaction record includes information which describes the respective transaction that the transaction record represents.

Linking information between one or more first type transaction records and one or more second type transaction records is defined. The defined linking information describes an relationship between a first type transaction and a second type transaction. Also in accordance with this second embodiment, a portion of the one or more second type transaction records is defined as import information. That is, recorded information about a second type transaction is designated as information to be imported to a transaction record of a first type transaction.

A relationship between one first type transaction record and one second type transaction record is identified based upon the linking information. That is, the defined linking information is utilized to identify a relationship between a first type transaction and a second type transaction.

After the relationship between the one first type transaction record and the one second type transaction record is identified, defined import information is associated with the one first type transaction record based on the one second type transaction record. This defined import information could be information from the one second type transaction record, another second type transaction record reconciled with the one second type transaction record, or from yet another second type transaction record that is associated with the one second type transaction record.

After importation, the one first type transaction record is then reconciled with another first type transaction record based upon the imported information.

According to one aspect of this second embodiment, the import information is either information included in another second type transaction record which is reconciled with the one second type transaction record, or information included in the one second type transaction record.

In yet another aspect of the second embodiment, each first type transaction and each second type transaction are one of a cash transaction, a securities transaction, or a foreign currency transaction. That is, the first type transactions could be cash transactions, while the second type transactions would be securities transactions or foreign currency transactions. Or, the first type transactions could be securities transactions, while the second type transactions would be cash transactions or foreign currency transactions. Or still further, the first type transactions could be foreign currency transactions, while the second type transactions would be cash transactions or securities transactions.

In a still further aspect of the present invention, each transaction record includes a plurality of fields. Each field stores information associated with the transaction with which that record is associated. According to this aspect, the defined linking information defines a first field included in each of the one or more first type transaction records and a second field included in each of the one or more second type transaction records. The relationship is identified is contents of a first field match the contents of a second field. Thus, a relationship is identified if a defined field in one transaction record match the contents of a defined field in another transaction record.

In yet another aspect of the present invention, the defined import information identifies a third field, and the import information is the contents of the identified third field. Thus, the contents of a field included in a second type transaction record are associated with the one first type transaction record. The one first type transaction record is then reconciled based upon the information from a second type transaction record.

The system of the second embodiment comprises a memory for storing one or more first type transaction records, one or more second type transaction records, defined linking information, and defined import information. As above, the memory can be any type of memory capable of storing data. The system also comprises a processor which identifies the a relationship between one first type transaction record and one second type transaction record based upon the linking information, associates defined import information with the one first type transaction record, and reconciles the one first type transaction record with another first type transaction record based upon the associated import information. The processor can be any type of processor capable of functioning as described herein.

It will also be understood by those skilled in the art that the invention is easily implemented using computer software. More particularly, software can be easily programmed, using routine programming skill, based upon the description of the invention set forth herein and stored on a storage medium which is readable by a computer processor to cause the processor to operate such that the computer performs in the manner described above.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 4 is a simplified depiction of a ledger including entries depicting a second type of transaction in accordance with the present invention.

FIG. 8 is a screen shot of a dialog box for managing enrichment passes in accordance with the present invention.

FIG. 9 is a screen shot of a dialog box for naming a new enrichment pass in accordance with the present invention.

FIG. 13 is a screen shot of a dialog box for defining destination side and a destination field for a new enrichment pass in accordance with the present invention.

FIG. 15 is a screen shot of a dialog box for defining what data will be passed from a source to a destination for a new enrichment pass in accordance with the present invention.

FIG. 16 is a screen shot of a dialog box for defining a destination field for a new enrichment pass in accordance with the present invention.

FIG. 17 is a dialog box for defining reversal options for a new enrichment pass in accordance with the present invention.

DETAILED DESCRIPTION OF A PREFERRED EMBODIMENT

Figure 1:
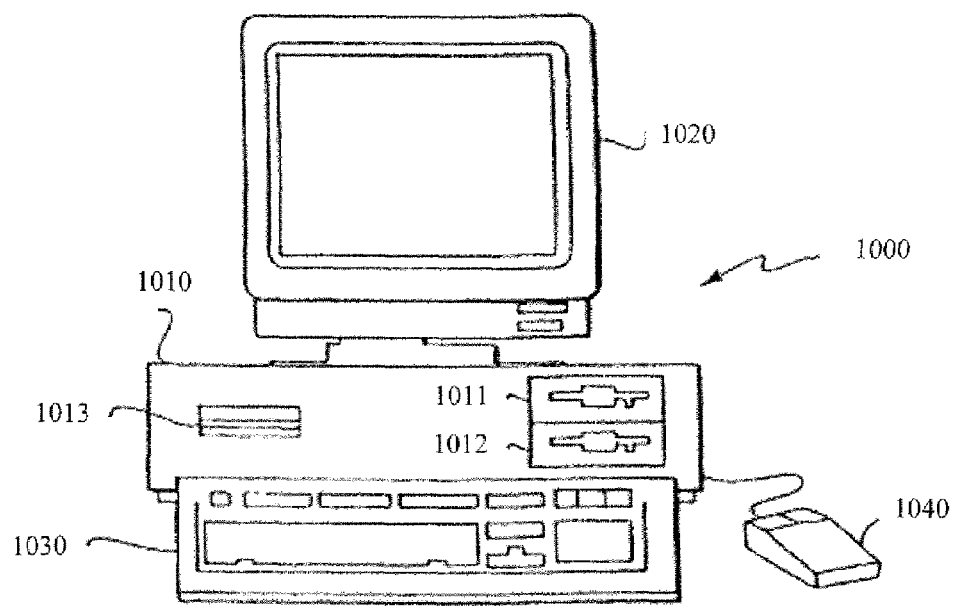
FIG. 1 depicts a computer suitable for use the present invention.
Figure 2:
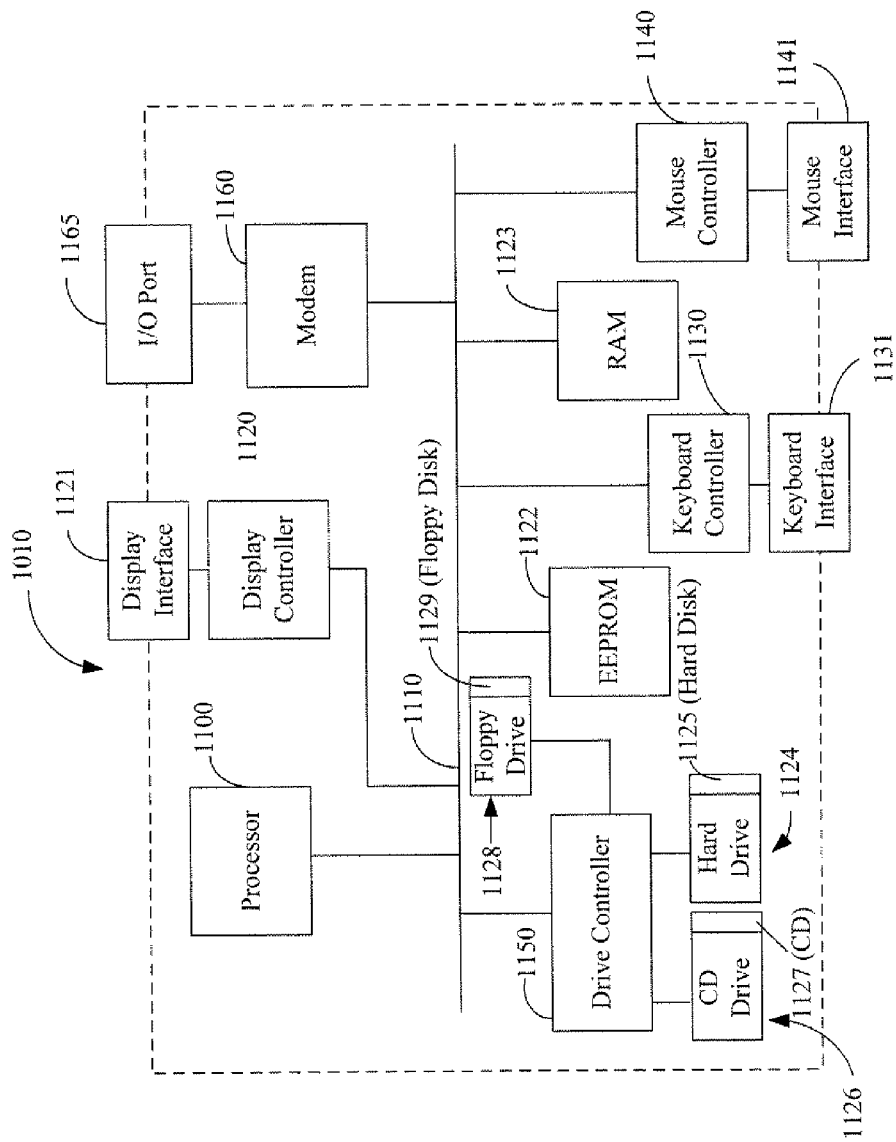
FIG. 2 is an exemplary block diagram of components of the computer depicted in FIG. 1.

FIGS. 1 and 2 depict an exemplary computing device suitable for use in the below-described invention. The device is preferably a commercially available high power, or mainframe computer. Here again, it will be recognized that the device configuration is exemplary in that other components (not shown) could be added or substituted for those depicted and certain of the depicted components could be eliminated if desired.

The device functions as described below in accordance with stored programming instructions which drive its operation. Preferably, the device stores its unique programming instructions on an EPROM or hard disk. It will be recognized that only routine programming is required to implement the instructions required to drive the server to operate in accordance with the invention, as described below. Further, since the device components and configuration are conventional, routine operations performed by depicted components will generally not be described, such operations being well understood in the art.

Referring to FIG. 1, the device 1000 includes a main unit 1010 with slots 1011, 1012, 1013 and 1014, respectively provided for loading programming or data from a floppy disk, CD, hard disk, and/or other storage means onto the server 1000. The device 1000 also includes a keyboard 1030 and mouse 1040, which serve as user input devices. A display monitor 1020 is also provided to visually communicate information.

As depicted in FIG. 2, the device 1000 has a main processor 1100 which is interconnected via bus 1110 with various storage devices including EPROM 1122, RAM 1123, hard drive 1124, which has an associated hard disk 1125, CD drive 1126, which has an associated CD 1127, and floppy drive 1128, which has an associated floppy disk 1129. The memories, disks and CD all serve as storage media on which computer programming and data can be stored for access by the processor 1100. The stored data includes accounting information. The memories associated with the device hereafter will be collectively referred to as memory 1170. A drive controller 1150 controls the hard drive 1124, CD drive 1126 and floppy drive 1128. Also depicted in FIG. 2 is a display controller 1120 interconnected to display interface 1121, a keyboard controller 1130 interconnected to keyboard interface 1130, a mouse controller 1140 interconnected to mouse interface 1141 and a modem 1160 interconnected to I/O port 1165, all of which are connected to the bus 1110. The modem 1160 and interconnected I/O port 1165 are used to transmit and receive signals. It will be understood that other components may be connected if desired to the bus 1110, including communications components other than a modem. By accessing the stored computer programming, the processor 1100 is driven to operate in accordance with the present invention.

Figure 3:
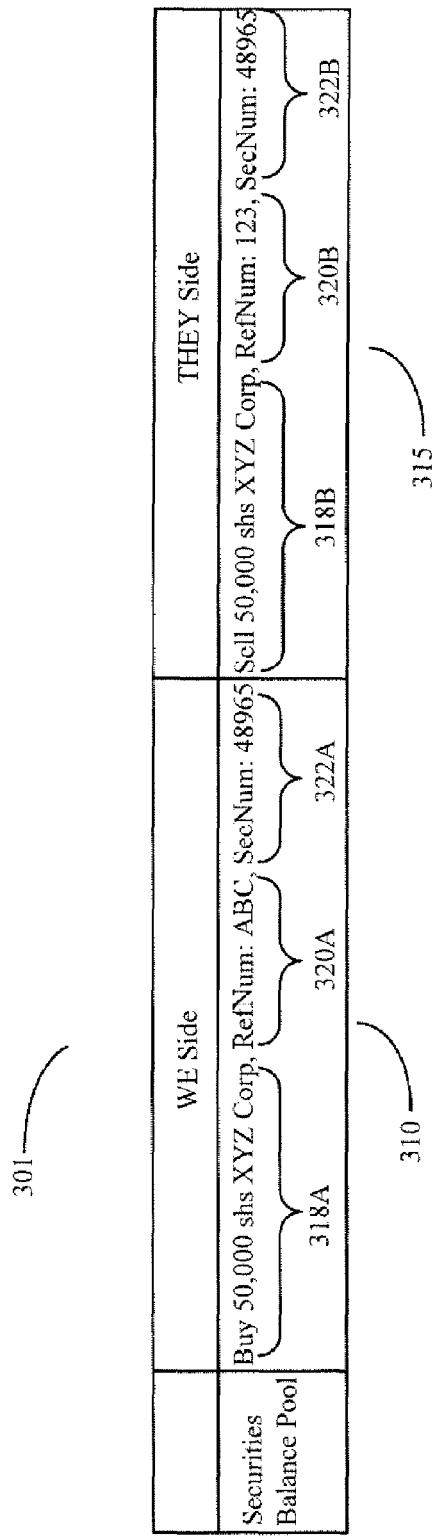
FIG. 3 is a simplified depiction of a ledger including entries depicting a first type of transaction in accordance with the present invention.

FIG. 3 is a simplified representation of a ledger 301 named Securities Balance Pool: 68 Global Custody which includes entries associated with securities transactions involving an account named "68 Global Custody," which is a part of a securities balance pool. As shown, the ledger includes "we" side entries 310 and "they" side entries 315. Each entry is associated with a transaction. For simplicity in describing the present invention, only two entries are shown, one "we" side, and one "they" side, though typically many more entries would be included in such a ledger. The Securities Balance Pool: 68 Global Custody ledger 301 is stored in memory 1170.

Information associated with each entry's transaction is included in the Securities Balance Pool: 68 Global Custody ledger 301. The ledger 301 includes a unique field for each type of information included. The information includes transaction identifier fields 318A and 318B, in this example a purchase of 50,000 shares of XYZ corporation stock for the "we" side transaction, and a sale of 50,0000 shares of XYZ corporation stock for the "they" side transaction. This information also includes reference number fields 320A and 320B, in this example the "we" side reference number is ABC, and the "they" side reference number is 123. A reference number is an identifier by which a party to a transaction identifies the transaction. Thus, the reference number ABC is the identifier given to the purchase of 50,000 shares of XYZ Corp. by the party maintaining the Securities Balance Pool: 68 Global Custody ledger 301. And, the reference number 123 is the identifier given to the sale of the 50,000 shares of XYZ Corp. by the party selling the shares.

Other information associated with a transaction is also typically included in the ledger, each stored in a designated field. The party maintaining the ledger defines the information stored in the ledger. In the present example, a security number, 48965, is also included in fields 322A and 322B. A security number is an identifier assigned to a transaction. The assignment can be done by an entity other than the purchaser or seller, by either, or by agreement between the purchaser and seller.

FIG. 4 is a simplified representation of a ledger 401 named Cash Balance Pool: GL 987-65432 which includes entries associated with cash transactions involving an account named "GL 987-65432," which is a part of a securities balance pool. As shown, the ledger includes "we" side entries 410 and "they" side entries 415. The Cash Balance Pool: GL 987-65432 ledger 401 is also stored in memory 1170. Each entry is associated with a transaction. For purposes of describing the present invention in the most straightforward manner, only one "we" side entry is shown, while five "they" side entries 415A-415E are shown. However, typically many more entries would be included in such a ledger.

Similar to the Securities Balance Pool: 68 Global Custody ledger 301, the Cash Balance Pool: GL 987-65432 ledger 401 includes information associated with each entry's transaction, stored in unique fields. The information includes transaction identifier fields 418A-418F, serial number fields 420A-420F, as well as other information (not shown). A serial number, also known as a reference number, is typically the same for associated share movement, cash movement, or foreign exchange/trade share or cash movement, As above, the party maintaining the ledger defines what information is included in the ledger. In the present example the one "we" side entry is identified as a $2,000,000 debit with reference number ABC. The five "they" side entries are each identified as $2,000,000 credits. Further, each "they" side entry is associated with a unique reference number.

In FIG. 3, the "we" side entry and the "they" side entry reflect the same transaction. Thus, a reconciliation of one would result in a match to the other, based upon the information stored in the fields. "We" side entries are typically entered into the Securities Balance Pool: 68 Global Custody ledger 301 upon execution. "They" side entries are entered into the Securities Balance Pool: 68 Global Custody ledger 301 from a statement typically provided by a stock custodian.

In FIG. 4, the single "we" side entry, in the amount of $2,000,000, corresponds to only one of the five "they" side transactions 415A-415E, each in the amount of $2,000,000. The five "they" side entries are each a candidate match to the single "we" side entry. As shown, however, information necessary to match the "we" side entry is not available from the Cash Balance Pool: GL 987-65432 ledger 401. That is, there is not sufficient field information to match entries. To match the "we" side entry to the correct one of the five "they" side entries, information found in the Securities Balance Pool: 68 Global Custody ledger 301 must be utilized.

FIGS. 5A-5E depict the processing of the present invention to match a first ledger entry with a second ledger entry utilizing information associated with a third ledger entry belonging to a different domain than the domain to which the first and second entries belong, and existing in a ledger different than that which the first and second ledger entries exist.

In the present example, the one "we" side entry in the Cash Balance Pool: GL 987-65432 ledger 401 is the subject entry. Introduced above and shown in FIG. 4, no information exists in the Cash Balance Pool: GL 987-65432 ledger 401 upon which to base a match of the subject entry with the "they" side entry 415C.

Figure 5A:
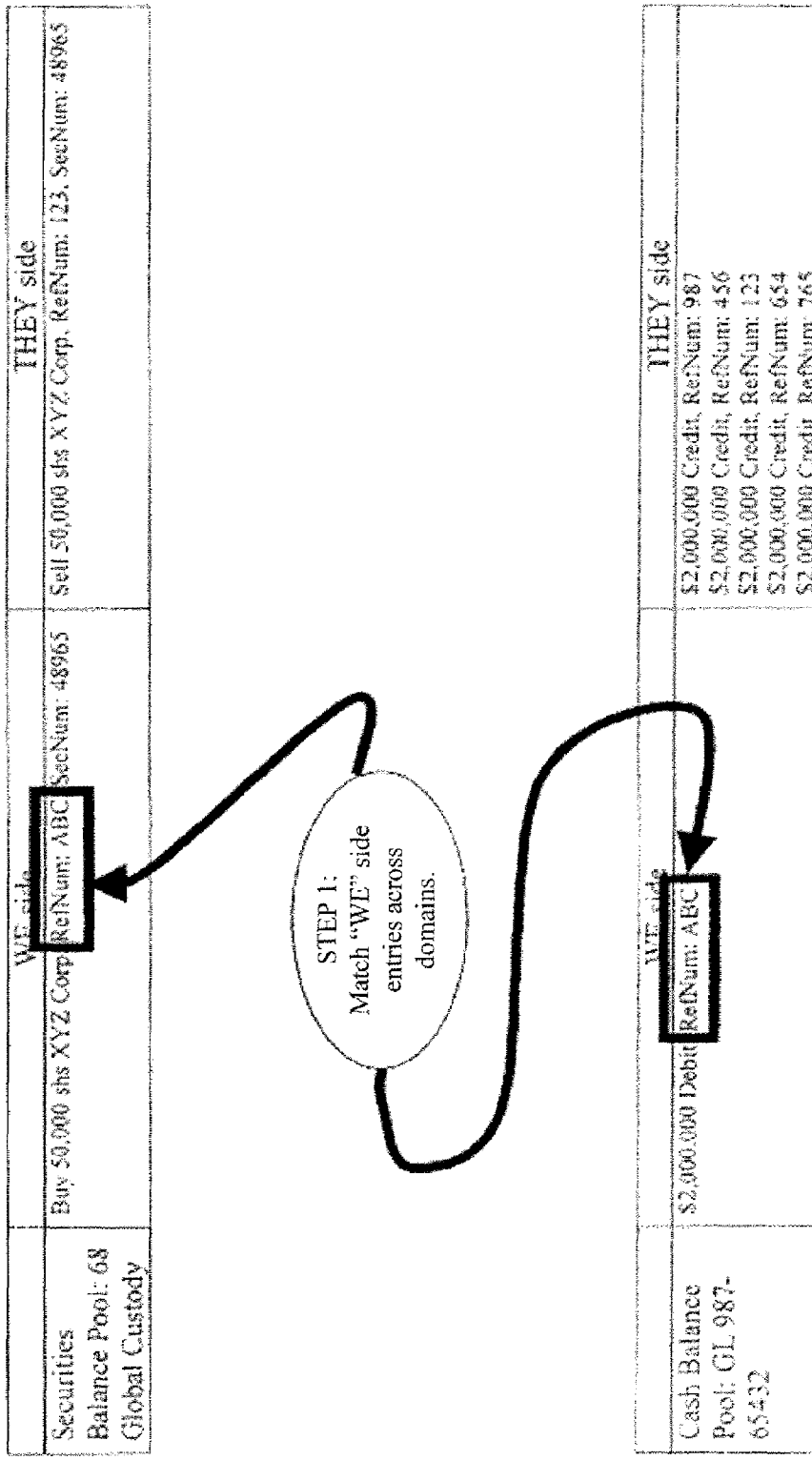
FIG. 5A depicts matching of an entry in the ledger of FIG. 4 with an entry in the ledger of FIG. 3 in accordance with an aspect of the present invention.

As shown in FIG. 5A, the first step is to match "we" side entries across domains, e.g. in different balance pools. In the present example, the "we" side entries are matched based upon the same reference number/serial number, ABC, though the matching could be based upon other information. For discussion herein, the Cash Balance Pool: GL 987-65432 is referred to as the first domain, and the Securities Balance Pool: 68 Global Custody is referred to as the second domain. The processor 1100 compares the information in the serial number field of the subject entry with the information in the reference number field in the "we" side entry in the second domain to perform the match.

Figure 5B:
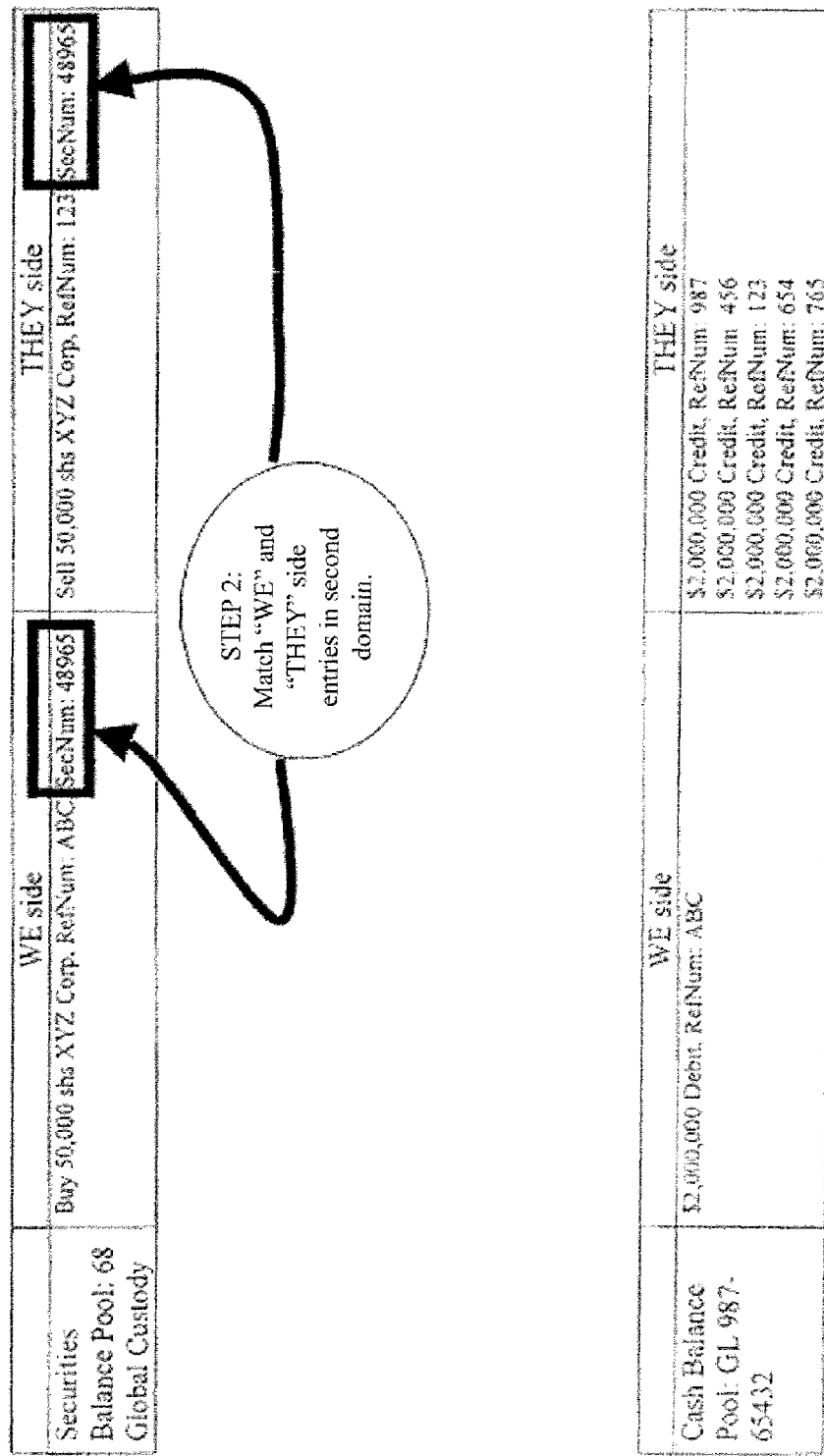
FIG. 5B depicts matching of entries in the ledger of FIG. 3 in accordance with an aspect of the present invention.

Next, in step two and as shown in FIG. 5B, the matched "we" entry in the second domain is matched, i.e., reconciled, with a "they" entry in the second domain. This matching is based upon the security number included in the "we" side entry and "they" side entry, though it could be based upon other information. The processor 1100 compares entries in the security number fields in the "we" side and "they" side entries in the second domain to perform the match. Step two could be performed at any time prior to step one, as a part of the reconciliation of the securities Balance Pool: 68 Global custody account.

Figure 5C:
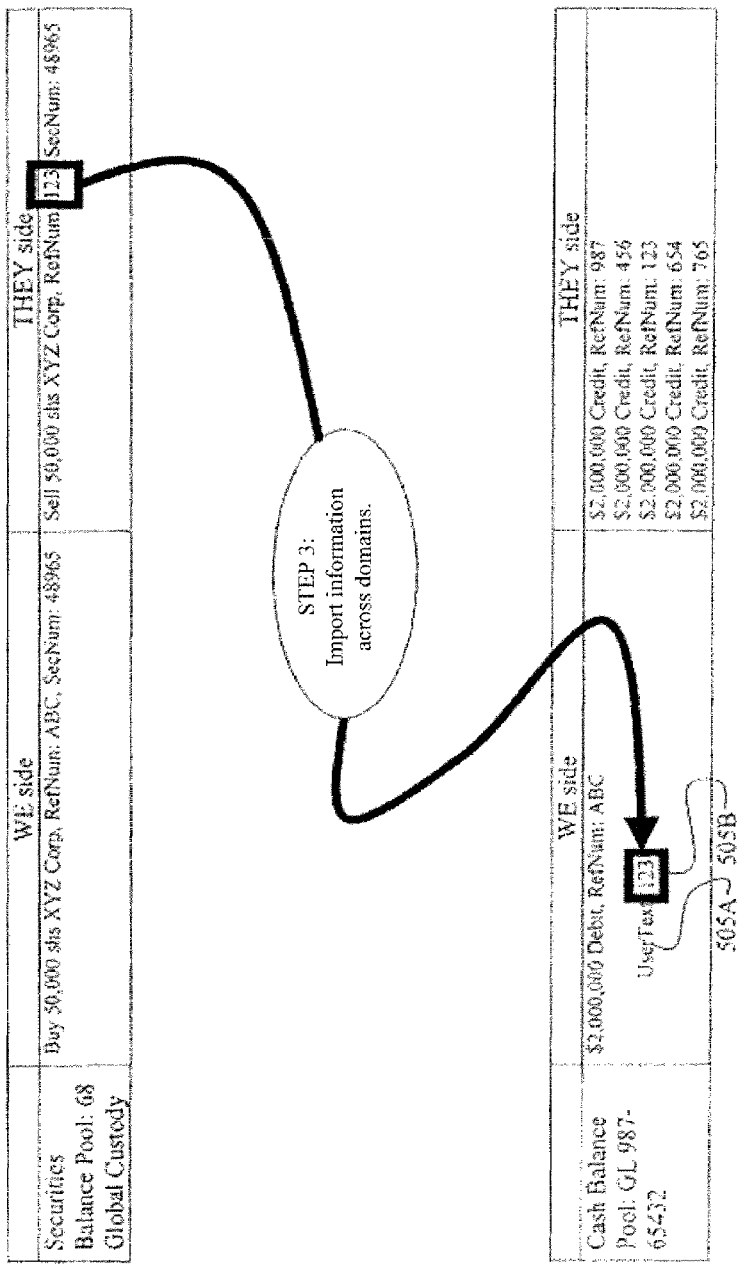
FIG. 5C depicts importation of data from the ledger of FIG. 3 into the ledger of FIG. 4 in accordance with an aspect of the present invention.

As shown in FIG. 5C, in step three the reference number from the matched "they" side entry in the second domain is imported into the subject entry of the first domain. Thus, the second domain is a source and the first domain is a destination. Furthermore the "they" side entry in the second domain is a source entry, and the "we" side entry in the first domain is a destination entry. The reference number is imported in this example because in this example it identifies the transaction to the other party. In this example, the other party is the seller of the 50,000 shares of XYZ Corp. stock. Of course, other identifying information, or additional identifying information, from the matched "they" side entry could be imported. Also, information from the "we" side entry of the second domain/source side could also be imported. The processor 1100 copies the information and stores it in the Cash Balance Pool: GL 987-65432 ledger 401 in an import field 505B, along with a user-defined label 505A, associated with the destination entry. The process of identifying and importing information is known as data enrichment, which will be further discussed below. The processor 1100 can now then use this enriched data, e.g. imported data, to reconcile the subject/destination entry with the appropriate "they" side entry of the Cash Balance Pool: GL 987-65432 ledger 401. This could be performed immediately subsequent to the data enrichment, or at any time thereafter.

Figure 5D:
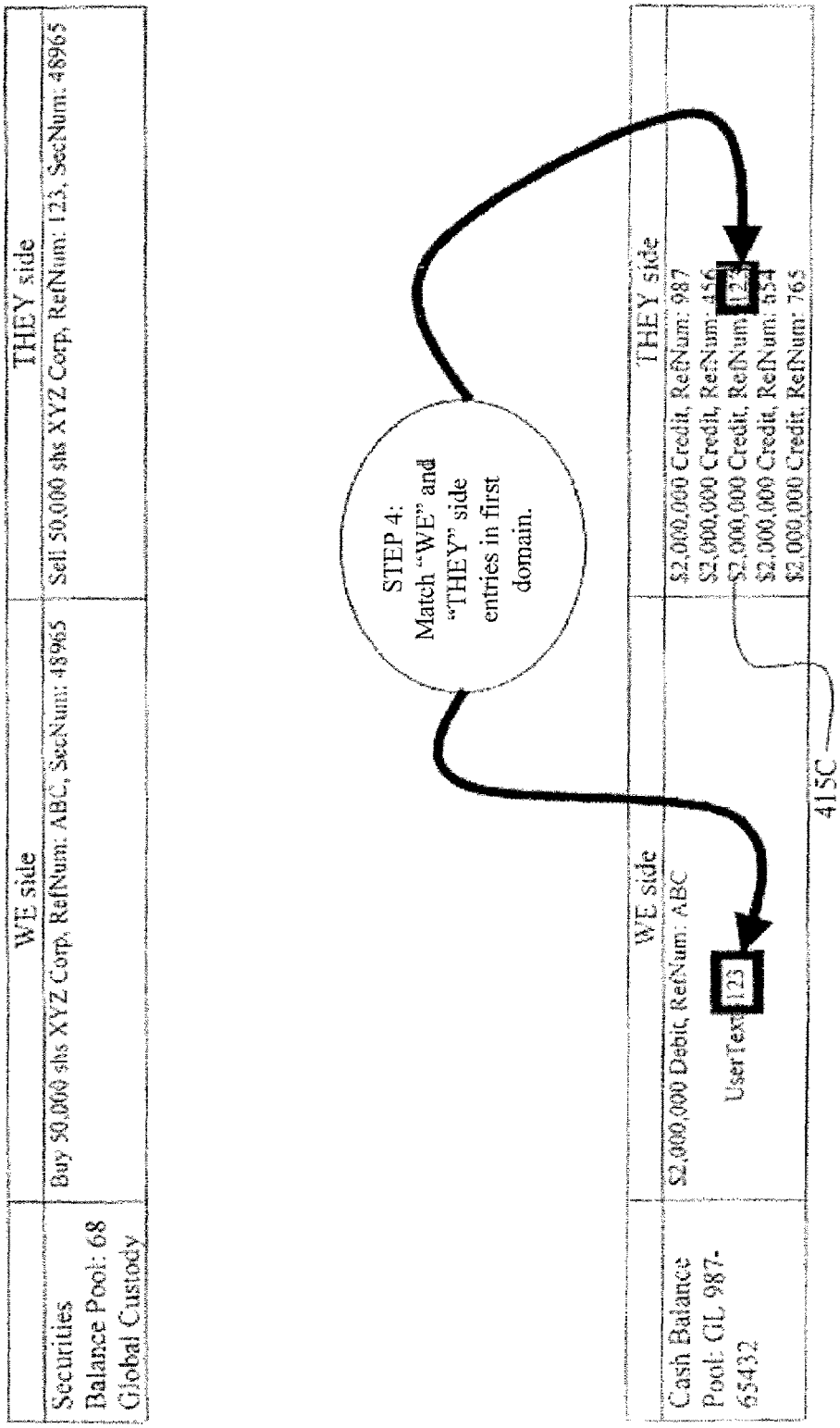
FIG. 5D depicts matching of entries in the ledger of FIG. 4 based upon the imported information of FIG. 5C in accordance with an aspect of the present invention.

FIG. 5D depicts the reconciliation of the "we" side entry in the first domain. At step four the "we" side entry is matched with the appropriate "they" side entry based upon the imported information, in this example, reference number. Thus, the processor 1100 matches the imported information, 123, with information in one of the "they" side entries. In this example, the imported information matches the reference number in the 415C entry.

Figure 5E:
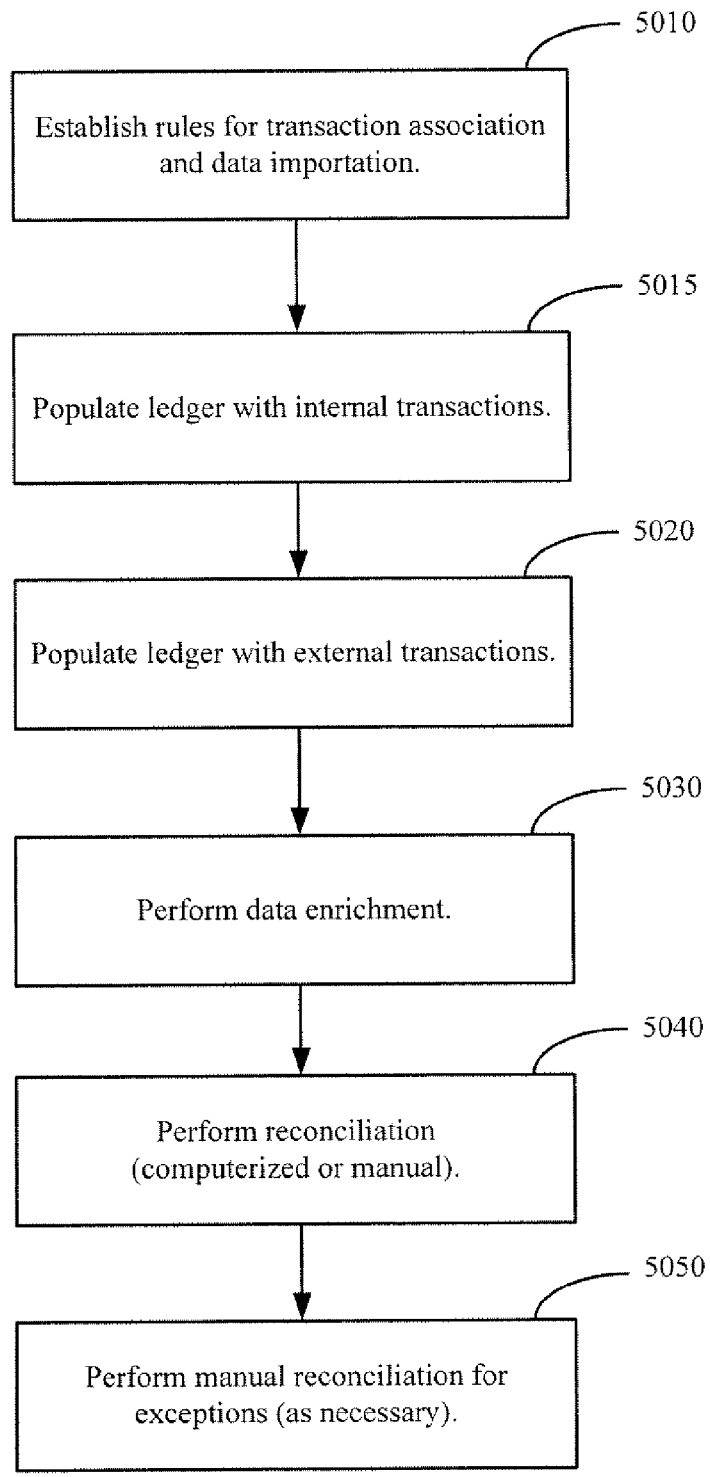
FIG. 5E is a simplified flow chart depicting the operations of the present invention.

FIG. 5E depicts an overview of the processing of the present invention. At step 5010 rules defining upon what basis transactions will be associated and what data will be imported are established. This is typically a one time process. It should be noted that multiple rules could be established. At step 5015 internal transactions are placed in a ledger. At step 5020 external transactions are placed in the ledger. Of course steps 5015 and 5020 could be performed in opposite order or concurrently. Also, step 5010 could follow step 5015 or step 5020. At step 5030, data enrichment of the present invention (data importation) is performed. At step 5040, the ledger is reconciled. This reconciliation is preferably by computer, though is could be manual. Finally, if reconciliation is by computer, any non-reconciled transactions (exceptions) are manually reconciled, step 5050.

Though not shown in FIG. 5E, step 5030 can be performed multiple times, each performance based upon a same rule established in step 5010, or based upon one of multiple rules established in step 5010, prior to performance of step 5040. Furthermore, though also not shown in FIG. 5E, the ledger entry, data enrichment, and reconciliation of steps 5015, 5020, 5030, and 5040 can also be performed on some periodic basis, or upon availability of new ledger entries.

Figure 6:
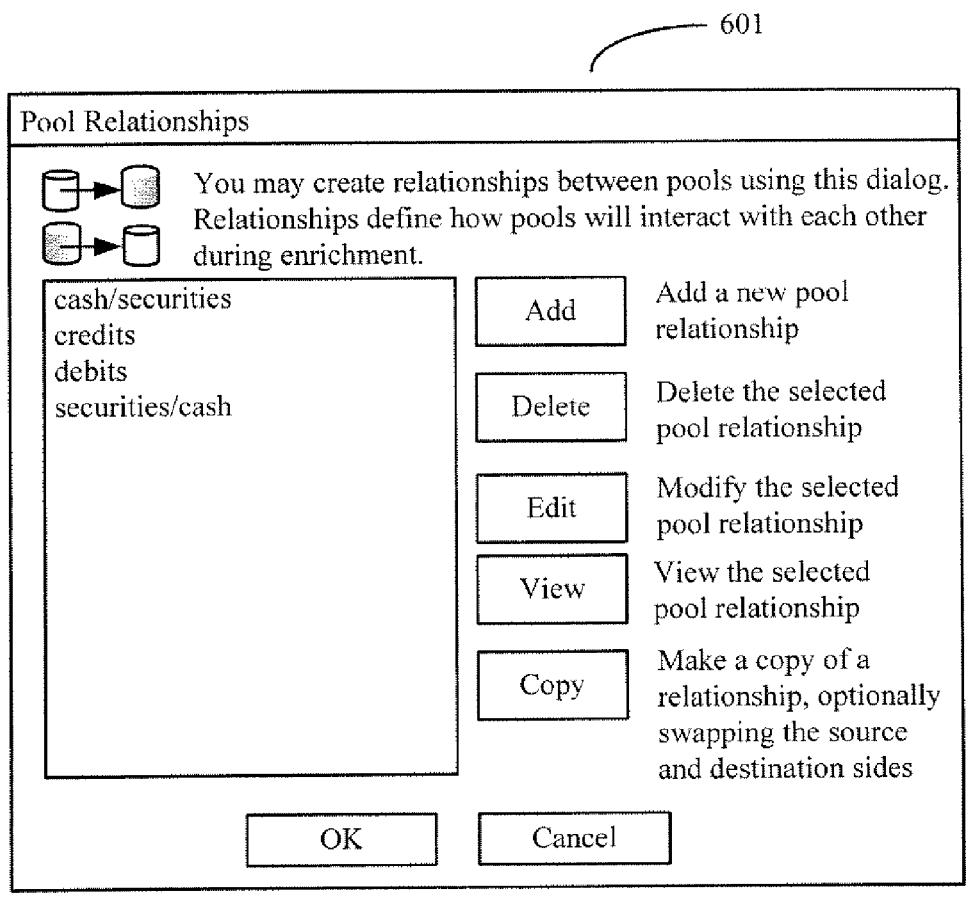
FIG. 6 is a screen shot of a dialog box for managing pool relationships in accordance with the present invention.

In accordance with the present invention, in data enrichment a user establishes relationships between balance pools, as well as establishes rules which define how the balance pools interact with one another. FIG. 6 is an exemplary screen shot of a Pool Relationship dialog box 601 for establishing relationships. As shown, the dialog box 601 includes a list of established relationships, i.e., "cash/securities," an "add" control, a "delete" control, an "edit" control, a "view" control, and a "copy" control.

To delete a pool relationship, a listed relationship is selected and the "delete" control is activated. To make a copy of a pool relationship, a listed relationship is selected and the "copy" control is activated. A copy dialog box (not shown) which allows the user to provide a new name for the copy is presented. Included in this copy dialog box is a control which allows the user to swap the source and destination sides in the copy. Source and destination sides will be further discussed below.

To view a pool relationship in a read-only mode, a listed relationship is selected and the "view" control is activated. To edit a pool relationship, a listed relationship is selected and the "edit" control is activated.

Figure 7:
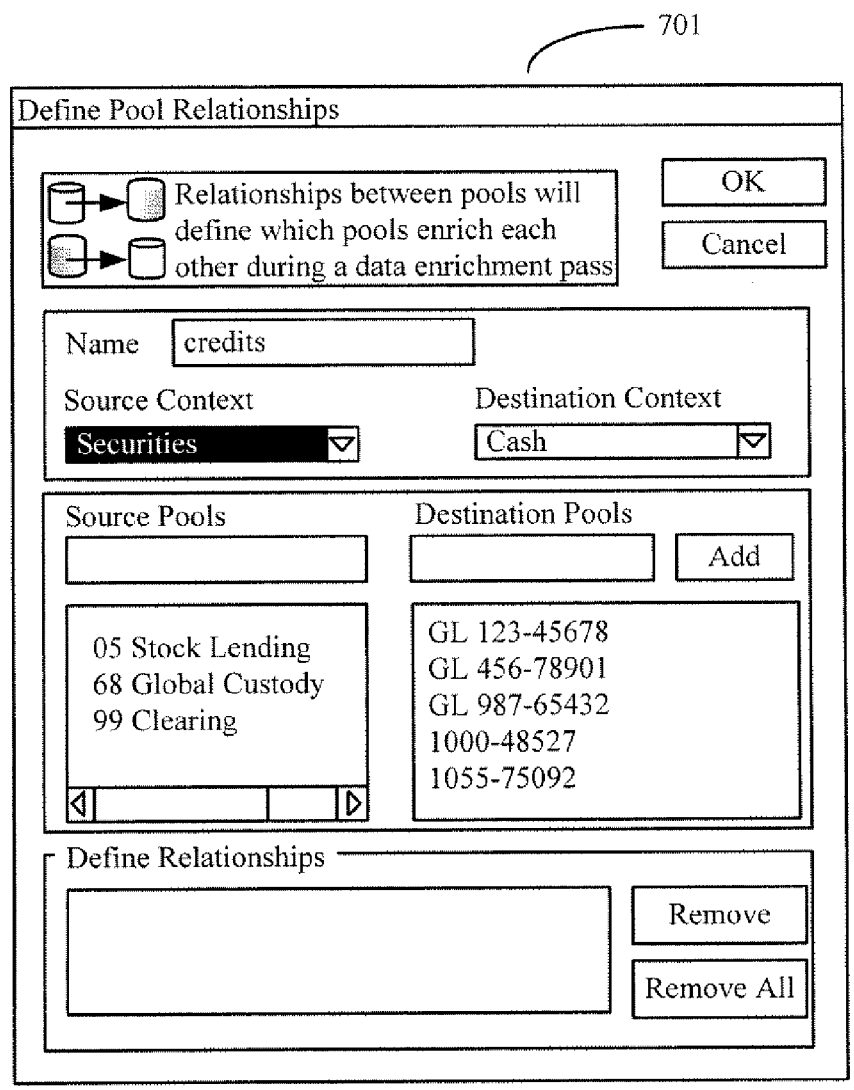
FIG. 7 is a screen shot of a dialog box for defining pool relationships in accordance with the present invention.

To add a pool relationship, the "add" control is activated. Activation of the "add" control causes a Define Pool Relationship dialog box to be presented. FIG. 7 is an exemplary screen shot of the Define Pool Relationship dialog box 701. Using this dialog box, the user can define which balance pools will be utilized in data enrichment. As shown, the user assigns a name for the pool relationship. In this example, the name "credits" is currently shown. The user also selects, for each pool relationship, source and destination contexts. The source context is the balance pool type from where information will be imported, while the destination context is the balance pool type to where information will be imported. In the present example, the user has selected the source context to be a securities balance pool, and the destination context to be a cash balance pool.

Once the source and destination contexts have been established, specific pools can be related. The processor populates the Source Pools field with securities balance pools, and the Destination Pools field with the cash balance pools. For the present example, the user relates the security balance pool "68 Global Custody" with the cash balance pool "GL 987-65432" by selecting those pools from the respective Source Pools field and Destination Pools field. Upon selection of the pools, the user actives the "add" control of FIG. 7. This newly defined pool relationship will appear in the "Defined Relationships" window and the bottom of the dialog box 701. This process must be repeated to add any other desired pool relationships.

Pool relationships can be defined as one-to-one, as discussed above, or one-to-many as well as many-to-many. For example, it is possible to set up a pool relationship between the "68 Global Custody" pool and both the "GL 987-65432" and "GL 123-45678" pools. To do so, the user would define a pool relationship between "68 Global Custody" and "GL-98765432" first, and then set up a pool relationship between "68 Global Custody" and "GL 123-45678." The only restriction when defining a pool relationship is that a pool may not be related to itself.

Introduced above, rules must be established which define how the related pools interact with one another. These rules are known as enrichment criteria. Enrichment criteria define exactly how specific entries in the source pool are linked with specific entries in the destination pool, and exactly which information is imported from the source pool to the destination pool.

Enrichment criteria are defined in enrichment passes. Managing of enrichment passes is accomplished via an Enrichment Passes screen. FIG. 8 is an exemplary screen shot of an Enrichment Passes screen 801. As shown, the Enrichment Passes screen 801 includes a list of defined passes, i.e., "cash 3-securities 3-they," an "add" control, a "delete" control, an "edit" control, a "view" control, and a "copy" control.

To delete an enrichment pass, a listed pass is selected and the "delete" control is activated. To make a copy of an enrichment pass, a listed pass is selected and the "copy" control is activated. A dialog box (not shown) which allow a user to provide a new name for the copy is presented. To view an enrichment pass in a read-only mode, a listed pass is selected and the "view" control is activated. To edit an enrichment pass, a listed pass is selected and the "edit" control is activated. This will launch an Enrichment Criteria Wizard, to be discussed below.

To add, e.g. define, an enrichment pass, the "add" control is activated. Activation of the "add" control causes the Enrichment Criteria Wizard to be presented. FIG. 9 is an exemplary screen shot of the first screen of the Enrichment Criteria Wizard to be presented, known as an Enrichment Pass Name screen 901. Using this screen, the user specifies a name for the enrichment pass. In the present example, the name "securities" is specified. Activation of a "next" control causes the second screen of the Enrichment Criteria Wizard to be presented, known as a Define Source-Pools screen.

Figure 10:
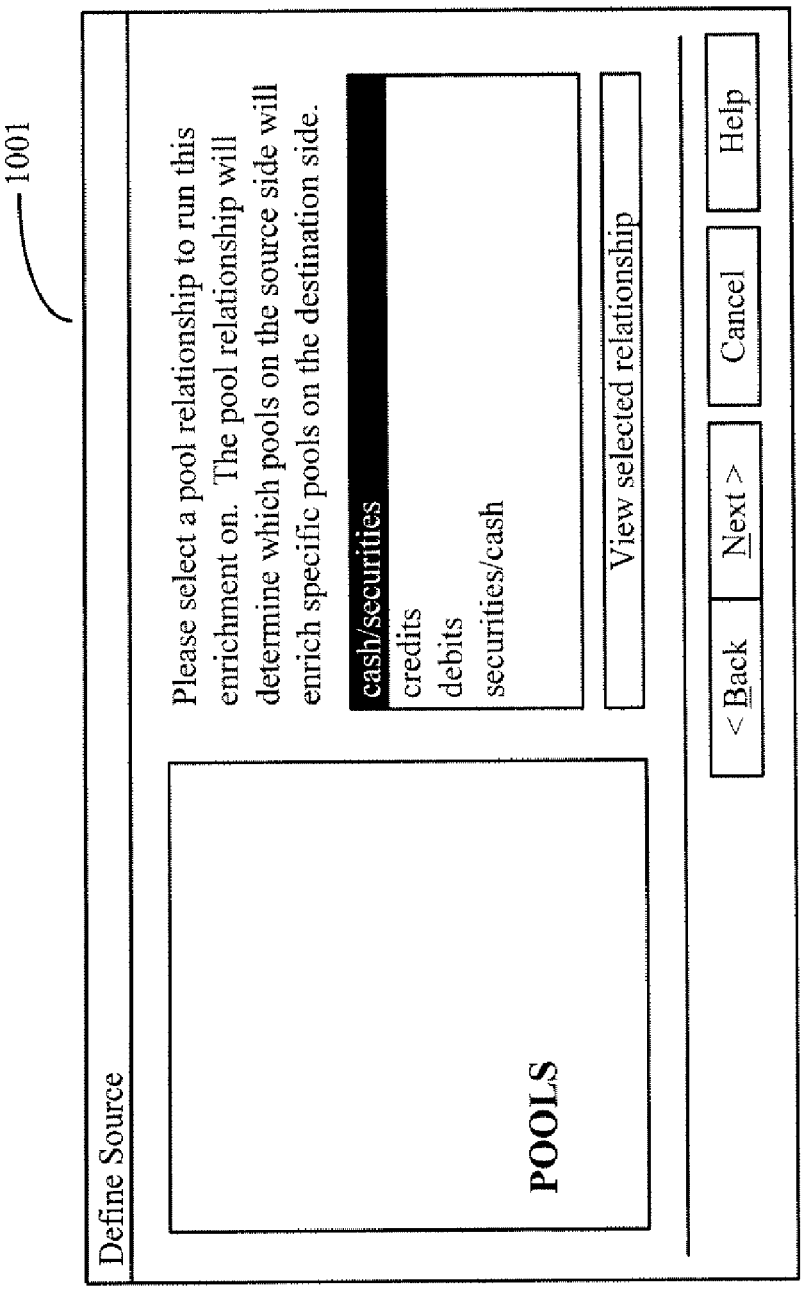
FIG. 10 is screen shot of a dialog box for defining a source for a new enrichment pass in accordance with the present invention.

FIG. 10 is an exemplary screen shot of the Define Source-Pools screen 1001. Utilizing this screen a user selects a previously defined pool relationship, discussed above. The processor 1100 populates a selection window with previously defined pool relationships. As shown, this includes a "cash/securities" pool relationship. The user selects one pool relationship. Activation of the "view selected relationship" control presents the contents of the selected pool relationship in a read-only mode. Activation of the "next" control causes the third screen of the Enrichment Criteria Wizard to be presented, known as a Define Source Side screen.

Figure 11:
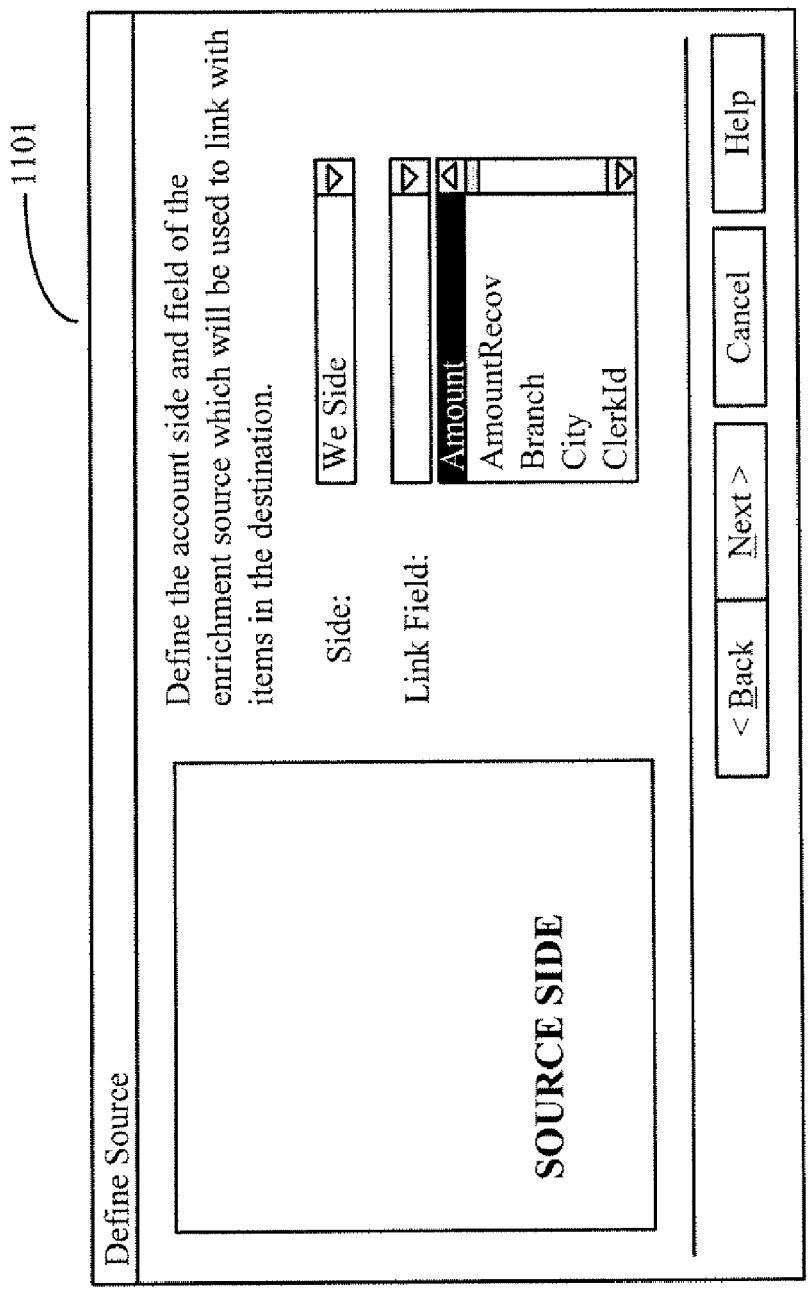
FIG. 11 is a screen shot of a dialog box for defining a source side and source field for a new enrichment pass in accordance with the present invention.

FIG. 11 is an exemplary screen shot of the Define Source Side screen 1101. Utilizing this screen, the Enrichment Criteria Wizard prompts a user to define how the source entries are identified. These settings will be used to determine how source entries relate to destination entries. This screen includes a "side" field in which the user chooses the side, i.e., "we," "they," or "internal," on which the source entries reside on. In accordance with the above example, the "we" side is selected. Also included is a "link" field in which the user chooses a field from the source entries which contains the desired information used in matching to destination entries. This field is populated by the processor 1100 with each field associated with the selected source side. In the above example, the user would select a field known as "RefNum", though this field selection is not shown in FIG. 11. Activation of a "next" control causes the fourth screen of the Enrichment Criteria Wizard to be presented, known as a Group Filters-Source Groups screen.

Figure 12:
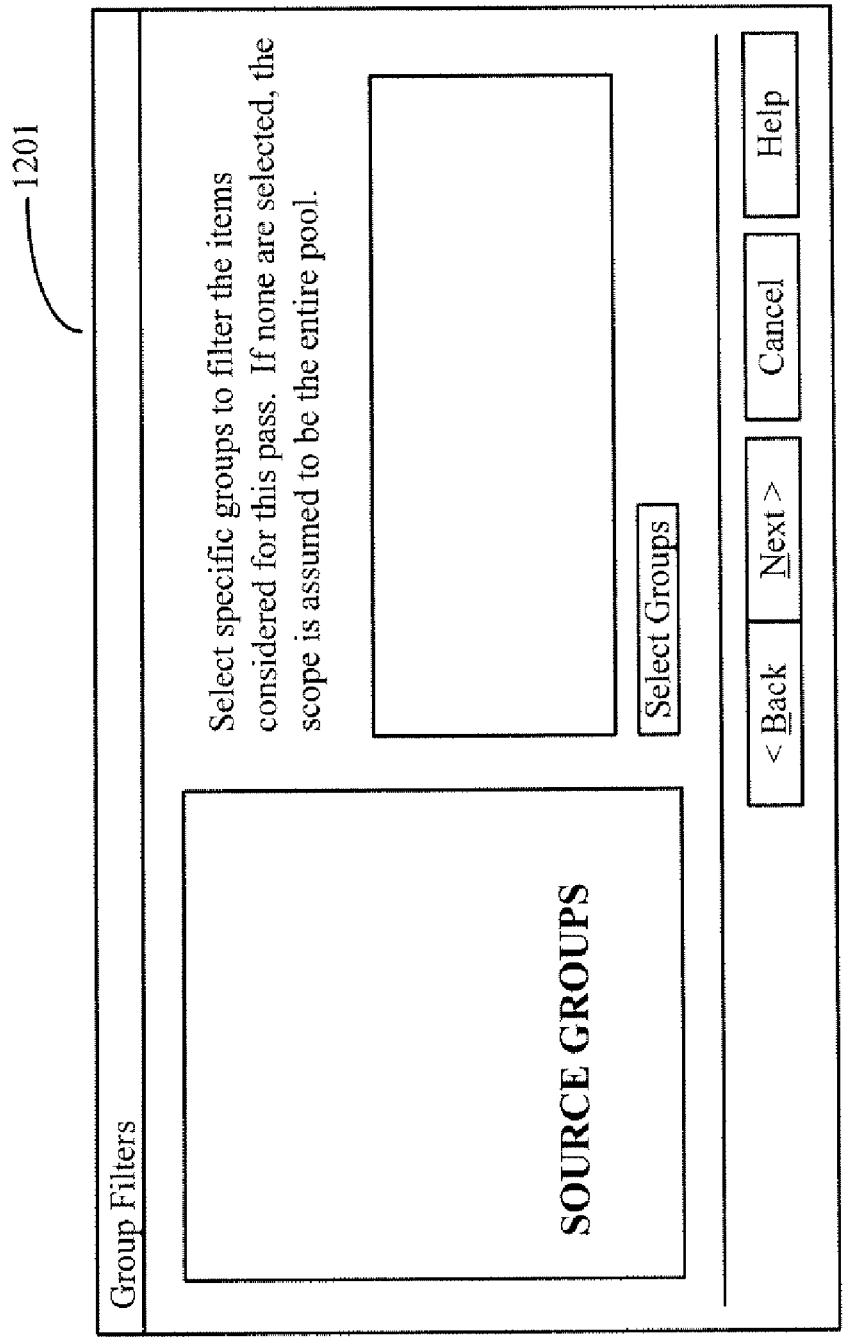
FIG. 12 is a screen shot of a dialog box for defining source group filters for a new enrichment pass in accordance with the present invention.

FIG. 12 is an exemplary screen shot of a Group Filters-Source Groups screen 1201. Utilizing this screen, the user can optionally define a subset of entries of the source pool to process during data enrichment. That is, not all source pool entries will be processed by the processor 1100. The user can define entries to be processed based upon attributes of the entries, such as matched entries, or only entries belonging to certain classes. Activation of the "next" control causes the fifth screen of the Enrichment Criteria Wizard to be presented, known as a Define Destination Side screen.

FIG. 13 is an exemplary screen shot of a Define Destination Side screen 1301. This screen is utilized in defining parameters for the destination pool. These parameters are used to determine how destination entries relate to source entries. Similar to the discussion above, in a "side" field the user selects the side, i.e., "we," "they," or "internal," the potentially matched elements of destination entries reside on. In accordance with the above example, the user selects "we." In a "link" field the user selects a field from the destination entries which contains the desired information to be used in matching to source entries. This field is populated by the processor 1100 with each field associated with the selected side of the destination pool. In the above example, the user would select a field known as "RefNum," though this field selection is not shown in FIG. 13. Activation of the "next" control causes the sixth screen of the Enrichment Criteria Wizard to be presented, known as a Group Filters-Destination Groups screen.

Figure 14:
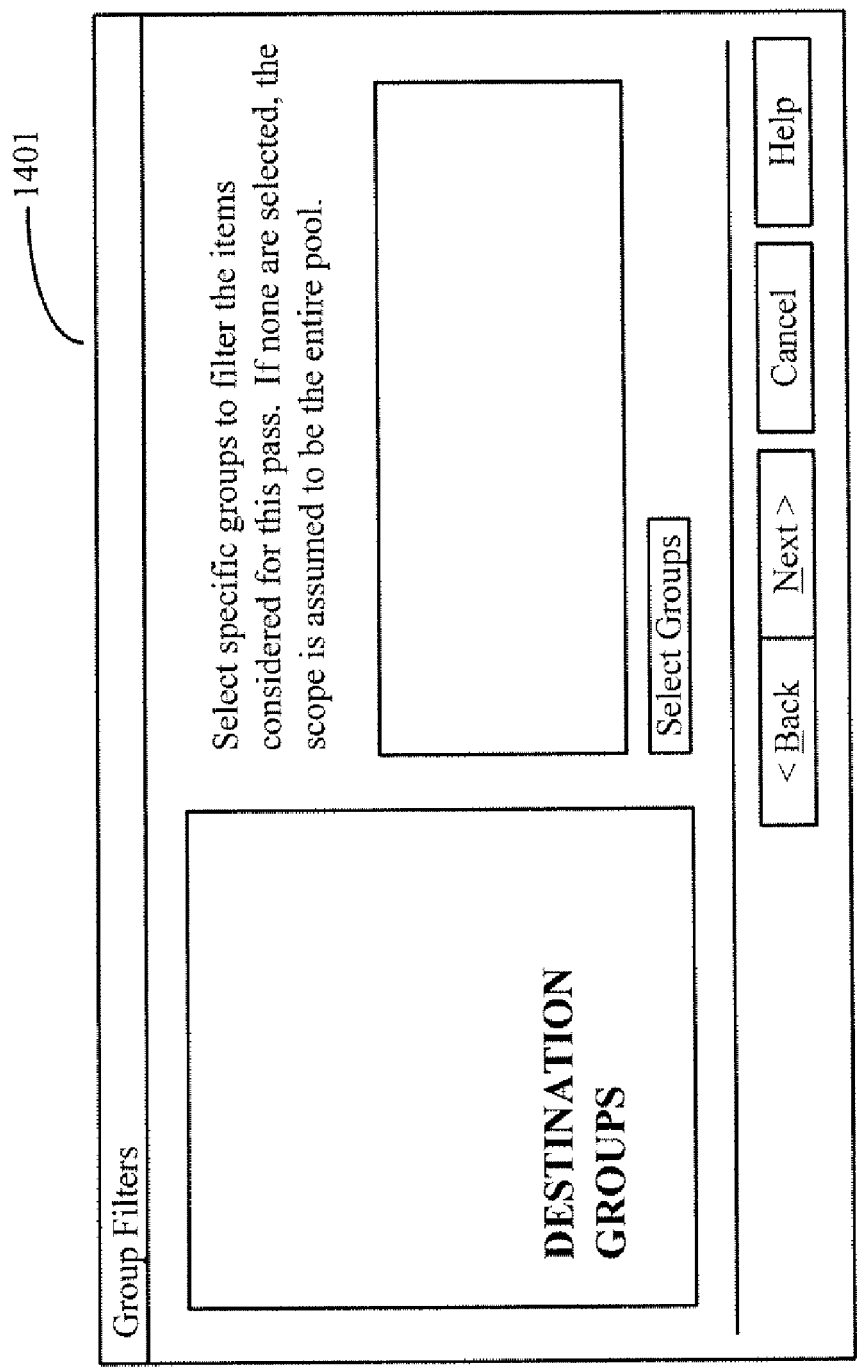
FIG. 14 is a screen shot of a dialog box for defining destination group filters for a new enrichment pass in accordance with the present invention.

FIG. 14 is an exemplary screen shot of a Group Filters-Destination Groups screen 1401. As with source pool filters, filters on the destination pool are also optional and user definable. The user can define a sub-set of destination entries to be processed. Activation of the "next" control causes the seventh screen of the Enrichment Criteria Wizard to be presented, known as an Enrichment Fields screen.

FIG. 15 is an exemplary screen shot of an Enrichment Fields screen 1501. Utilizing this screen, the user establishes what information gets imported from the source pool to the destination pool when a link, e.g. match, between a source entry and a destination entry is found. At least one criterion must be established for the enrichment pass, but multiples are allowed. As shown in FIG. 15, a window is populated by the processor 1100 with existing criteria, e.g., "populate Addr1 with Account from source item." To edit an existing criterion, select an existing criterion from the window and active the "edit" control. To delete an existing criterion, select an existing criterion and activate the "delete" control. To create a new enrichment criterion, activate the "add" button. Activation of the "add" button causes an Enrichment Detail screen, which is a part of the Wizard, to be presented.

FIG. 16 is an exemplary screen shot of an Enrichment Detail screen 1601. In the above example, information was imported to the destination entry in a User Text field from the RefNum field of a match to the source entry. The Enrichment Detail screen 1601 defines the import process. To establish an enrichment criterion, the user must first specify what field in the destination entry should be filled with the imported information. The Enrichment Detail screen 1601 includes a drop-down menu listing all non-critical fields in the destination entry, populated by the processor 1100, as any information in a destination field will be overwritten with imported information.

There are three manners in which information can be imported to a destination entry, which correspond to the three "source" selections shown in FIG. 16. In a first manner, information from a field of the source is imported. The user selects the field from the source entry to import into the chosen destination field. The list of source fields is filtered by the processor 1100 by data type, based upon the data type of the chosen destination field. In a second manner, information from a field of a match to the source entry is imported. For source entries in a one-to-one match group, it is possible to import information from a field on the match of the source entry into the chosen destination field. The user selects from which field, from a pull-down menu, of the source entry's match information will be imported. This pull-down menu is filtered by the processor 1100 based upon the data type of the chosen destination field. If the source item is not matched, no importation will occur. Finally, the user can designate default data to be imported. The user defines, in a provided field, the information to be placed in the destination field.

If the user chooses to import information from a source entry's match, activation of an "OK" controls causes a Reversal Options screen to be presented to the user. FIG. 17 is an exemplary screen shot of a Reversal Options screen 1701. Utilizing this screen, the user specifies what actions should occur if the match of the source entry is dissolved. That is, what action should occur if the match later becomes unmatched to the source. An unmatching could occur for several reasons relating to accounting practices, as will be understood by one familiar with accounting.

The user has three reversal options. The first option is an option not to reverse the data enrichment. That is, regardless of the state of the match subsequent to a first data enrichment pass, the information which was imported to the destination entry during the first data enrichment pass will not be removed in a subsequent data enrichment pass.

The second option is an option to reverse the first data enrichment pass. If a destination entry is enriched by a first data enrichment pass, in this option, another enrichment pass will reverse the enrichment if the match between the source and the match has been dissolved since the first enrichment. Reversal only occurs if the source entry is not matched in the other enrichment pass, and if the destination fields have not been edited subsequent to the first enrichment pass. If the source entry is matched in another one-to-one match, the field, or fields, of the destination are enriched with information from the source entry's new match. The third option is an option to reverse the data enrichment only if the destination entry is unmatched at the time of the subsequent enrichment pass, i.e., unreconciled. The conditions for this reversal option are the same as the second option, with the added restriction that only unmatched destination entries are reversed. A check-box option allows the user to place messages on any matched entry where enrichment would have been reversed if those entries had been unmatched.

Figure 18:
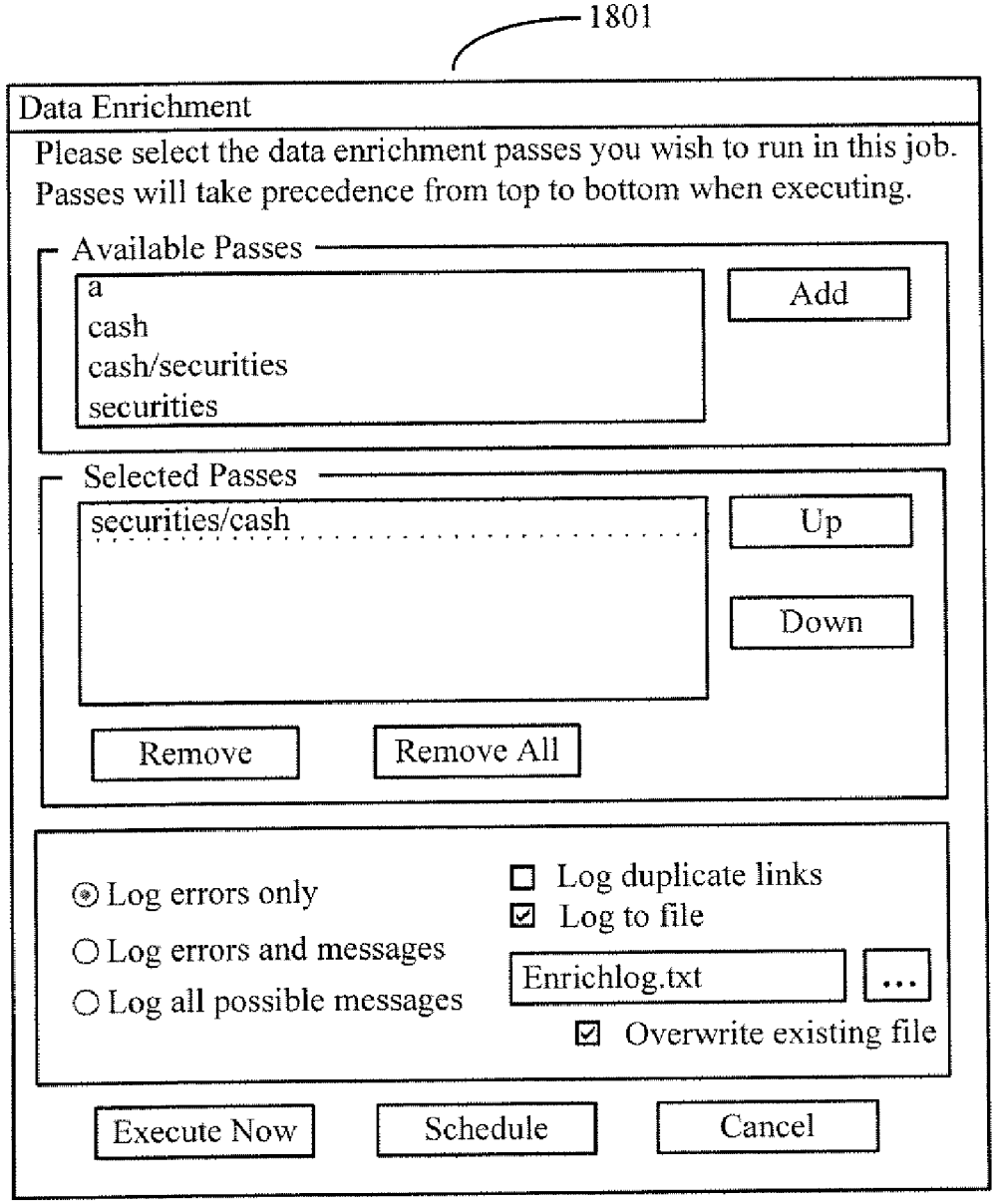
FIG. 18 is a dialog box for selecting an existing enrichment pass for execution in accordance with the present invention.

An enrichment pass may be run ad hoc or scheduled. FIG. 18 is an exemplary screen shot of an Execute Data Enrichment dialog box 1801 for defining when an enrichment pass is executed, as well as for defining logging options. The processor 1100 populates an Available Passes window in the Execute Data Enrichment dialog box 1801 with each defined enrichment pass. The user chooses one or more enrichment passes to run and activates the "add" control. The selected pass(es) appear in a Selected Passes window. The order in which passes appear in the Selected Passes window is the order in which the passes will be run. To change the order, the user selects an enrichment pass from the Selected Passes windows and activates either an "up" or "down" control.

The present invention supports multiple levels of error and status logging. The user selects the levels from a Logging Options area of the dialog box 1801. The user can select to log errors only, log errors and messages, and log all possible messages. With any of the three logging options, the user can select to log duplicate links, and select to log to file. Selection of log duplicate links determines whether any logging should take place when more than one source entry or destination entry are found to have the same link, e.g. field, value. Data enrichment, for each enrichment pass, only takes place when the values chosen for the source entry's and destination entry's link fields are unique. If one or both are not unique, the destination entries are not enriched. That is, if multiple source items have the same link field value as a destination link field value, that destination item will not be enriched. Likewise, if multiple destination items have a same link field value as a source item, neither destination item will be enriched. Choosing to log duplicate links will cause this event to be included in the output log.

To execute an enrichment pass, or a group of enrichment passes, the user activates the "Execute Now" control of dialog box 1801. To schedule an enrichment pass, or group of enrichment passes, the user selects the "Schedule" control. Activating the "Schedule" control causes a standard scheduler screen to be presented to the user, in which the user defines when to execute the pass or group of passes.

Upon execution the processor 1100 will search for all entries in the destination side, subject to any pool filters, which have a match on a link field with an entry in the source side, also subject to any pool filters. Whenever a match is found, information from the enrichment source entry will be imported into the destination entry, as specified in the enrichment criteria. Additionally, the source and destination entries are related to one another. That is, an indication that the two entries are related is stored. The user can view a list of all related entries. A user can also manually relate two entries.

If the enrichment criteria defines that information is to be imported from a source's match, unmatched source entries and those in aggregate match groups are excluded from the source side population. Also, if two or more destination entries have the same link field value as a source entry, the multiple destination entries will not be enriched for any given enrichment pass.

After a data enrichment pass, or group of passes, has been executed, the enriched pool can be reconciled utilizing both data typically included in that pool's ledger and data imported from another pool as a result of enrichment. With the enriched data there is more information upon which to base reconciliation, reducing the likelihood of a exception.

If an exception should occur, the present invention aids in manual reconciliation. A user can utilize logged indications of duplicate links, discussed above, to identify possible matches to unreconciled entities. Also, the user can view the list of related entries as an aid in identifying possible matches. And, the user can select any single entry and view any and all related entries to that single entry.

The present invention is not to be limited in scope by the specific embodiments described herein. Indeed, various modifications of the present invention in addition to those described herein, will be apparent to those of skill in the art from the foregoing description and accompanying drawings. Thus, such modifications are intended to fall within the scope of the appended claims.

We claim:

1. A computer-implemented method, comprising:
    retrieving an internally generated first transaction;
    receiving at least one externally generated second transaction, wherein the internally generated first transaction and the at least one externally generated second transaction are associated with a first type of balance pool;
    matching the internally generated first transaction with a third transaction, wherein the third transaction is associated with a second type of balance pool different from the first type of balance pool, wherein the first type of balance pool and the second type of balance pool are selected from the group consisting of (i) a cash balance pool, (ii) a securities balance pool, and (iii) a foreign currency balance pool;
    importing data associated with the matched third transaction into an import field of the internally generated first transaction;
    reconciling the internally generated first transaction with one of the at least one externally generated second transaction using the import field of the internally generated first transaction, wherein the import field is not available with the internally generated first transaction prior to importing; and
    storing an indication of the reconciled internally generated first transaction and the externally generated second transaction in a memory.

2. The computer-implemented method of claim 1, wherein the third transaction is one of (i) an internally generated third transaction, and (ii) an externally generated third transaction.

3. The computer-implemented method of claim 1, wherein matching the internally generated first transaction with the third transaction includes:
    matching the internally generated first transaction with a fourth transaction associated with the second type of balance pool; and
    matching the matched fourth transaction with the third transaction.

4. The computer-implemented method of claim 3, further comprising:
    defining linking information between the internally generated first transaction and the fourth transaction and between the fourth transaction and the third transaction, wherein the defined linking information is utilized in matching the internally generated first transaction with the third transaction.

5. The computer-implemented method of claim 4, wherein defining linking information comprises associating a field of the internally generated first transaction with a first field of the fourth transaction, and associating a second field of the fourth transaction with a field of the third transaction.

6. The computer-implemented method of claim 1, further comprising:
    defining linking information between the internally generated first transaction and the third transaction, wherein the defined linking information is utilized in matching the internally generated first transaction with the third transaction.

7. The computer-implemented method of claim 6, wherein defining linking information comprises associating a field of the internally generated first transaction with a field of the third transaction.

8. The computer-implemented method of claim 1, wherein the internally generated first transaction is associated with a first ledger, the externally generated second transaction is associated with a second ledger, and the third transaction is associated with a third ledger.

9. The computer-implemented method of claim 1, wherein the first type of balance pool and the second type of balance pool include transactions selected from the group consisting of a cash transactions, securities transactions, and foreign currency transactions.

10. The computer-implemented method of claim 1, wherein the internally generated first transaction is associated with a first department of a first entity and the externally generated second transaction is associated with a second entity external to the first entity.

11. The computer-implemented method of claim 10, wherein the third transaction is associated with one (i) a second department of the first entity and (ii) a third entity external to the first entity.

12. A computer-implemented system, comprising:
a memory for storing programming instructions;
a processor in communication with the memory, wherein the processor is operable to execute the programming instructions to:
retrieve an internally generated first transaction;
receive at least one externally generated second transaction, wherein the internally generated first transaction and the at least one externally generated second transaction are associated with a first type of balance pool;
match the internally generated first transaction with a third transaction, wherein the third transaction is associated with a second type of balance pool different from the first type of balance pool, wherein the first type of balance pool and the second type of balance pool are selected from the group consisting of (i) a cash balance pool, (ii) a securities balance pool, and (iii) a foreign currency balance pool;
import data associated with the matched third transaction into an import field of the internally generated first transaction;
reconcile the internally generated first transaction with one of the at least one externally generated second transaction using the import field of the internally generated first transaction, wherein the import field is not available with the internally generated first transaction prior to importation; and
store an indication of the reconciled internally generated first transaction and the externally generated second transaction in the memory.

13. The computer-implemented system of claim 12, wherein the third transaction is one of (i) an internally generated third transaction, and (ii) an externally generated third transaction.

14. The computer-implemented system of claim 13, wherein matching the internally generated first transaction with the third transaction includes the processor executing the programming instructions to:
match the internally generated first transaction with a fourth transaction associated with the second type of balance pool; and
match the matched fourth transaction with the third transaction.

15. The computer-implemented system of claim 12, wherein the processor is further operable to execute the programming instructions to:
define linking information between the internally generated first transaction and the fourth transaction and between the fourth transaction and the third transaction, wherein the defined linking information is utilized in matching the internally generated first transaction with the third transaction.

16. The computer-implemented system of claim 15, wherein the defined linking information includes an association of a field of the internally generated first transaction with a first field of the fourth transaction, and an association of a second field of the fourth transaction with a field of the third transaction.

17. The computer-implemented system of claim 12, wherein the processor is further operable to execute the programming instructions to:
define linking information between the internally generated first transaction and the third transaction, wherein the defined linking information is utilized in matching the internally generated first transaction with the third transaction.

18. The computer-implemented system of claim 17, wherein the defining linking information includes an association of a field of the internally generated first transaction with a field of the third transaction.

19. The computer-implemented system of claim 12, wherein the first type of balance pool and the second type of balance pool include transactions selected from the group consisting of a cash transactions, securities transactions, and foreign currency transactions.

20. The computer-implemented system of claim 12, wherein the internally generated first transaction is associated with a first ledger, the externally generated second transaction is associated with a second ledger, and the third transaction is associated with a third ledger.

21. The computer-implemented system of claim 12, wherein the internally generated first transaction is associated with a first department of a first entity and the externally generated second transaction is associated with a second entity external to the first entity.

22. The computer-implemented system of claim 21, wherein the third transaction is associated with one (i) a second department of the first entity and (ii) a third entity external to the first entity.

23. A computer-implemented system, comprising:
means for retrieving an internally generated first transaction;
means for receiving at least one externally generated second transaction, wherein the internally generated first transaction and the at least one externally generated second transaction are associated with a first type of balance pool;
means for matching the internally generated first transaction with a third transaction, wherein the third transaction is associated with a second type of balance pool different from the first type of balance pool, wherein the first type of balance pool and the second type of balance pool are selected from the group consisting of (i) a cash balance pool, a securities balance pool, and (iii) a foreign n currency balance pool;
means for importing data associated with the matched third transaction into an import field of the internally generated first transaction;
means for reconciling the internally generated first transaction with one of the at least one externally generated second transaction using the import field of the internally generated first transaction, wherein the import field is not available with the internally generated first transaction prior to importation; and
means for storing an indication of the reconciled internally generated first transaction and the externally generated second transaction in a memory.

* * * * *